United States Patent [19]

Ubelacker et al.

[11] Patent Number: 4,964,794

[45] Date of Patent: Oct. 23, 1990

[54] INSTALLATION FOR DEEP-DRAWING AND BACK-FOAMING OF UPHOLSTERY COVERS

[75] Inventors: Horst Ubelacker, Hohenburg; Helmut Storch, Amberg; Peter Buchwald, Sulzbach-Rosenberg, all of Fed. Rep. of Germany

[73] Assignee: Integram Inc., Newmarket, Canada

[21] Appl. No.: 377,102

[22] Filed: Jul. 10, 1989

[30] Foreign Application Priority Data

Jul. 12, 1988 [DE] Fed. Rep. of Germany ....... 3823690

[51] Int. Cl.⁵ .................. B29C 39/10; B29C 51/26
[52] U.S. Cl. .................................. 425/117; 264/292; 425/126.1; 425/388; 425/394; 425/398
[58] Field of Search ................ 425/4 R, 817 R, 117, 425/125, 126.1, 128, 121, 387.1, 388, 398, 394, 402, 453, 454, 112, 395, 397; 264/291, 292

[56] References Cited

U.S. PATENT DOCUMENTS

| | | | |
|---|---|---|---|
| 3,981,670 | 9/1976 | Levy | 425/398 |
| 4,043,729 | 8/1977 | Paracchi | 425/453 |
| 4,360,334 | 11/1982 | Kiefer | 425/402 |
| 4,540,460 | 9/1985 | Blomquist et al. | 425/126.1 |
| 4,755,117 | 7/1988 | Onnenberg et al. | 425/117 |
| 4,755,120 | 7/1988 | Onnenberg et al. | 425/125 |
| 4,824,630 | 4/1989 | Mohney | 425/126.1 |

*Primary Examiner*—Jay H. Woo
*Assistant Examiner*—Khanh P. Nguyen
*Attorney, Agent, or Firm*—Cushman, Darby & Cushman

[57] ABSTRACT

In an installation for deep-drawing and back-foaming of upholstery covers, the deep-drawing molds are disposed on a round table. Besides the round table for the deep-drawing molds, a stationary stretch piston station is provided, serving all deep-drawing molds on the round table passing the stretch piston station.

4 Claims, 2 Drawing Sheets

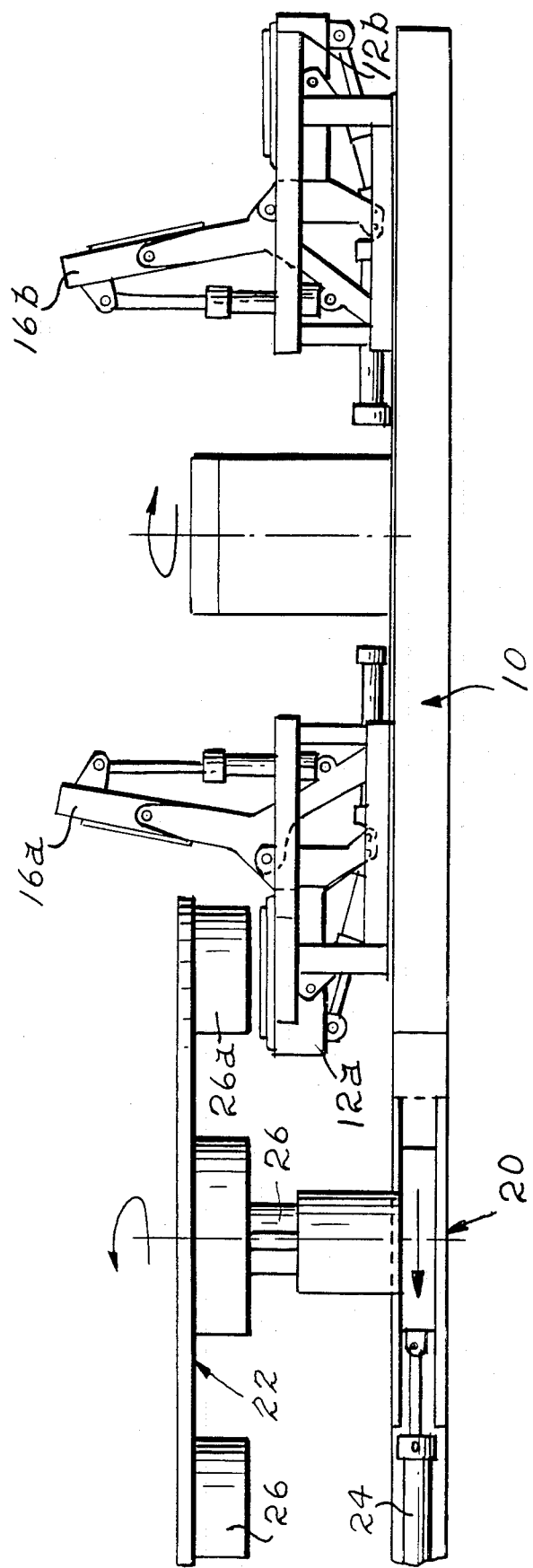

INSTALLATION FOR DEEP-DRAWING AND BACK-FOAMING OF UPHOLSTERY COVERS

The invention relates to an installation for deep-drawing and back-foaming of upholstery covers having a plurality of deep-drawing molds arranged on a rotatable round table, at least one stretch piston being provided, which presses the covers stretched on the molds into the molds.

BACKGROUND OF THE INVENTION

According to the state of the art, each deep-drawing mold support is provided with its own stretch piston support, the stretch piston of which presses the cover stretched on the deep-drawing mold into the deep-drawing mold prior to the back-foaming operation. In other words, the number of stretch pistons in the installation equals the number of deep-drawing molds on the round table. This state of the art is illustrated in the attached FIG. 1, in which the rotatable round table, on which deep-drawing molds 12a and 12b have been disposed, has been assigned reference numeral 10. Each deep-drawing mold 12a and 12b is provided with its own stretch piston 14a, 14b, carried by the round table, by means of which a cover stretched on the deep-drawing mold 12a, 12b is pressed into the deep-drawing mold prior to the back-foaming operation. The reference numerals 16a and 16b designate the upper parts of the mold, by means of which the deep-drawing molds 12a and 12b are closed prior to back-foaming, which is performed at a special work station disposed stationary next to the round table 10 and which is being cyclically passed by the separate work stations 12a and 12b. Supports for the stretch pistons 14a and 14b are designated by 18a and 18b.

If, for example, fourteen deep-drawing molds 12a ... are provided, the state of the art requires the provision of fourteen stretch pistons 14a ...

SUMMARY OF THE INVENTION

It is an object of the invention to provide a new concept for such an installation which makes it possible to make do with fewer stretch pistons than there are deep-drawing molds, if some deep-drawing molds on the round table should be the same.

This object is attained by the invention, based on an installation of the type described above, in providing, separate from the round table for the deep-drawing molds, a stretch piston station which serves all deep-drawing molds on the round table which pass the stretch piston station.

It is then possible for one and the same stretch piston to service two or a plurality of deep-drawing molds, if these are of the same type, i.e. if the stretch piston can be used for all these molds, in particular, if these molds are similar in size and design.

Because of this, it is possible to reduce the number of stretch pistons and associated lift devices and it is additionally attained that the mass to be moved on the round table is smaller, which brings advantages known per se, such as lesser acceleration and braking forces in connection with the cyclical movements of the round table.

Advantageously, the stretch piston station has as many different stretch pistons as there are different molds on the round table.

To this end the stretch pistons are disposed on a rotatable star.

In a preferred embodiment the star as a whole can be raised and lowered, so that only a single lift device is provided for all stretch pistons.

BRIEF DESCRIPTION OF THE DRAWING

FIG. 2 is a similar schematic view of the apparatus of the invention.

DETAILED DESCRIPTION OF THE PREFERRED EMBODIMENT

Figure 1:
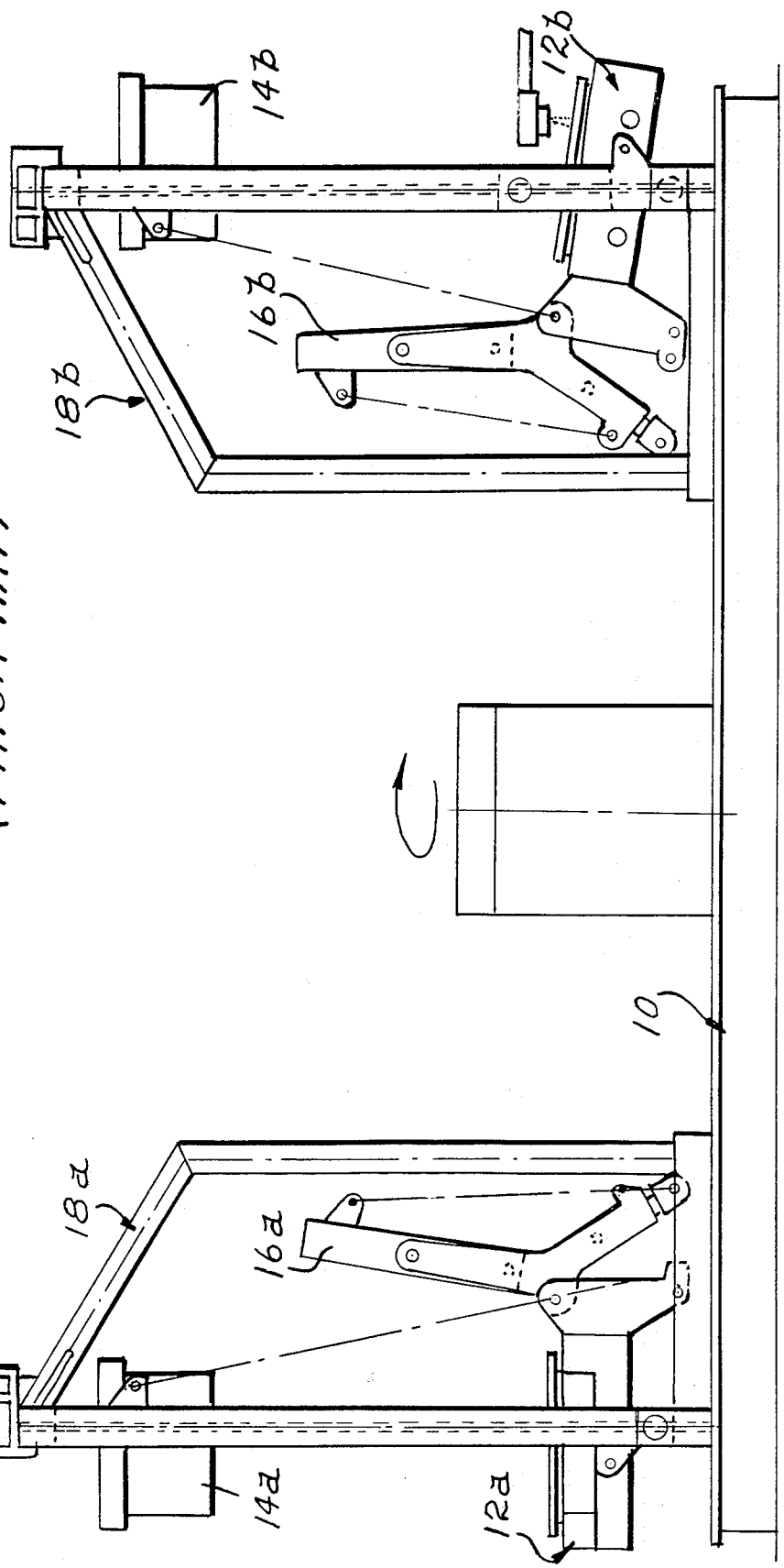
FIG. 1 is a schematic elevation view of the apparatus of the prior art.

The invention is illustrated in detail in the attached FIG. 2. This drawing shows a schematic lateral view of the invention. As before, deep-drawing molds 12a and 12b with their adjustable upper mold parts 16a and 16b are disposed on the round table 10. These deep-drawing molds are cyclically moved past a stationary stretch piston station 20. Mounted adjacent the stretch piston station 20 is a rotatable mounting structure or star 22 which is relatively horizontally rotatable about an axis parallel with the axis of rotation of the round table 10 by means of a piston-cylinder unit 24, as shown, so that a selected one of the stretch pistons 26a, 26b at the ends of the arms of the rotatable star 22 can be brought into a working position above a cooperatively configured deep-drawing mold brought to this stretch piston station and can be removed from this working position. It is attained in this manner that after the stretching operation the associated upper mold part can close the deep-drawing mold without it being required that the deep-drawing mold be moved away from the stretch piston station. The reference numeral 26 designates a lifting device for the star 22, by means of which all stretch pistons 26a, 26b can be lifted or lowered, thus in particular the stretch piston which is actually in a working position above a deep-drawing mold can be moved through a working movement in cooperating relation therewith.

What is claimed is:

1. An installation for deep-drawing and back-foaming of upholstery covers comprising
   a rotatable table having a series of deep-drawing molds arranged thereon so as to be moved successively into and out of a stationary stretch piston station,
   a plurality of stretch pistons,
   means for mounting said plurality of stretch pistons for selective movement of any one of said stretch pistons into a working position within said stationary stretch piston station and thereafter through a working movement in cooperating relation with a deep-drawing mold moved into said stretch piston station whereby a cover stretched on a deep-drawing mold in said stretch piston station is pressed into the mold by the stretch piston in said working position during the working movement thereof,
   said series of deep-drawing molds including a plurality of deep-drawing molds of different configuration,
   said plurality of stretch pistons including a stretch piston individually configured to cooperate with each deep-drawing mold of different configuration.

2. An installation as defined in claim 1 wherein said stretch piston mounting means includes a mounting structure having a plurality of outwardly extending arms, said plurality of stretch pistons being carried by outer ends of said arms, and means for mounting said mounting structure for rotational movement about an axis disposed equidistantly inwardly of said plurality of arms whereby selective rotation of said mounting structure about said rotational axis serves to move any selected one of the stretch pistons into said working position within said stretch piston station.

3. An installation as defined in claim 2 wherein said rotatable table includes a rotational axis disposed parallel with the rotational axis of said mounting structure.

4. An installation as defined in claim 2 wherein said stretch piston mounting means further includes means for moving said mounting structure along its rotational axis to effect the working movement of the stretch piston in said working position in cooperating relation with the deep-drawing mold in said stretch piston station.

* * * * *